United States Patent
Ding et al.

(10) Patent No.: US 9,826,093 B2
(45) Date of Patent: Nov. 21, 2017

(54) MOBILE TERMINAL CALLING REQUEST MESSAGE PROCESSING METHOD, DEVICE AND SYSTEM

(71) Applicants: Beijing Qihoo Technology Company Limited, Beijing (CN); QIZHI SOFTWARE (BEIJING) COMPAMY LIMITED, Beijing (CN)

(72) Inventors: Yi Ding, Beijing (CN); Yuan Li, Beijing (CN)

(73) Assignees: Beijing Qihoo Technology Company Limited, Beijing (CN); QIZHI SOFTWARE (BEIJING) COMPANY LIMITED, Beijing (CN)

( * ) Notice: Subject to any disclaimer, the term of this patent is extended or adjusted under 35 U.S.C. 154(b) by 173 days.

(21) Appl. No.: 14/766,409

(22) PCT Filed: Jan. 27, 2014

(86) PCT No.: PCT/CN2014/071579
§ 371 (c)(1),
(2) Date: Aug. 6, 2015

(87) PCT Pub. No.: WO2014/121712
PCT Pub. Date: Aug. 14, 2014

(65) Prior Publication Data
US 2016/0028884 A1 Jan. 28, 2016

(30) Foreign Application Priority Data
Feb. 6, 2013 (CN) .......................... 2013 1 0048493

(51) Int. Cl.
*H04M 3/436* (2006.01)
*H04W 12/12* (2009.01)
(Continued)

(52) U.S. Cl.
CPC ........ *H04M 3/436* (2013.01); *H04L 65/1069* (2013.01); *H04L 65/1079* (2013.01); *H04W 12/08* (2013.01); *H04W 12/12* (2013.01)

(58) Field of Classification Search
CPC .. H04W 12/12; H04W 12/08; H04L 65/1069; H04L 65/1079; H04M 3/436
(Continued)

(56) References Cited

FOREIGN PATENT DOCUMENTS

| CN | 101478591 A | 7/2009 |
| CN | 101854424 A | 10/2010 |

(Continued)

OTHER PUBLICATIONS

International Patent Application No. PCT/CN2014/071579; International Search Report; dated May 9, 2014; 2 pages.

*Primary Examiner* — Sam Bhattacharya
(74) *Attorney, Agent, or Firm* — Baker & Hostetler LLP

(57) ABSTRACT

Disclosed are method, device and system for processing a calling requires message of a mobile terminal, the method comprising: triggering a pre-embedded blocking program in the calling process; upon detecting a calling request message, the blocking program acquires an incoming call number in the calling request message; the blocking program determines whether the incoming call number is a call number defined by a preset rule, if the incoming call number is a call number defined by the preset rule, then delaying the ring of the phone number defined by the preset rule. The present invention protects a user from the harassment of a malicious harassing call, thus avoiding unnecessary financial loss.

15 Claims, 5 Drawing Sheets

(51) Int. Cl.
*H04W 12/08* (2009.01)
*H04L 29/06* (2006.01)

(58) Field of Classification Search
USPC .................. 455/410, 411, 414.1, 414.3, 415
See application file for complete search history.

(56) References Cited

FOREIGN PATENT DOCUMENTS

| | | | |
|---|---|---|---|
| CN | 103152739 A | 6/2013 | |
| WO | WO 01/17206 A1 | 3/2001 | |

MOBILE TERMINAL CALLING REQUEST MESSAGE PROCESSING METHOD, DEVICE AND SYSTEM

CROSS-REFERENCE TO RELATED APPLICATIONS

This application is a National Phase Application of Application No. PCT/CN2014/071579, filed on Jan. 27, 2014, which claims priority to Chinese Patent Application No. 201310048493.1, filed on Feb. 6, 2013, the disclosures of which are incorporated by reference in their entireties.

TECHNICAL FIELD

The present invention relates to the field of communication technology, particularly relates to a method for processing a calling request message of a mobile terminal, a mobile terminal for processing a calling request message, a system installed in the mobile terminal for processing a calling request message, a computer program and a computer readable medium.

BACKGROUND ART

In the modern society, with the development of communication technology, means of communication, such as mobile phone, becomes more and more popular and induces non-negligible influence in studying, working and living life of people. However, the popularity of mobile phones is also utilized by some lawbreakers to obtain interests.

An existing situation is that the lawbreakers make malicious calls using automatic equipment or manually, and terminate the call when receiving the ring message from the phone number that being attacked in the communication system, harassing the number being attacked or tricking a call-back from this number to obtain fee by cheating. Such kind malicious harassing call is an annoyance to mobile phone users.

Therefore, an urgent technical problem needs to be solved by the person skilled in the art to propose a processing mechanism for a calling request message of a mobile terminal, so that the mobile phone users can avoid unnecessary financial loss from being harassed by those malicious harassing calls.

SUMMARY OF THE INVENTION

A method for processing a calling request message of a mobile terminal, a corresponding device for processing a calling request message of a mobile terminal, a system installed in the mobile terminal for processing a calling request message, a computer program and a computer readable medium are proposed in the present invention to provide a solution or at least provide a partial solution to the above mentioned problem.

In accordance with one aspect of the present invention, a method for processing a calling request message of a mobile terminal is provided, comprising:

Triggering a pre-injected blocking program in the calling process;

upon detecting a calling request message, acquiring the incoming phone number in the calling request message by the blocking program;

determining whether the incoming phone number is a phone number defined by a preset rule by the blocking program;

if the incoming phone number is defined by a preset rule, then delaying a ring of the phone number defined by the preset rule.

In accordance with one aspect of the present invention, advice for processing a calling request message of a mobile terminal is provided, comprising:

a triggering module, configured to trigger a pre-injected blocking program in the calling process;

an incoming phone number acquisition module in the blocking program, configured to acquire the incoming phone number in the calling request message upon detecting the calling request message;

a judgment module in the blocking program, configured to determine whether the incoming phone number is a phone number defined by the preset rule; if the incoming phone number is a phone number defined by the preset rule, then calling the delay module in the blocking program;

a delay module in the blocking program, configured to delay the ring of the phone number defined by the preset rule.

In accordance with one aspect of the present invention, a system installed in a mobile terminal for processing a calling request message is provided, comprising a triggering module and a blocking module, wherein:

the triggering module is configured to trigger the pre-injected blocking module in the calling process;

the blocking module is configured to acquire the incoming phone number in the calling request message upon detecting the calling request message and determine whether the incoming phone number is a phone number defined by the preset rule; if the incoming phone number is a phone number defined by the preset rule, then delaying a ring of the phone number defined by the preset rule; if the incoming phone number is not a phone number defined by the preset rule, then ringing according to the incoming phone number;

In accordance with another aspect of the present invention, a computer program is provided, including computer readable codes; when the computer readable codes are executed in the mobile terminal, the mobile terminal implements any one of the methods for processing a calling request message of a mobile terminal according to claims 1-6.

In accordance with another aspect of the present invention, a computer readable medium is provided, in which the program as described in claim 14 is stored.

The beneficial effects of the present invention are:

according to the method, device and system for processing a calling request message of a mobile terminal, a blocking program can be injected by acquiring a root privilege after detecting that the mobile terminal system is under a privilege escalation, to control the calling process of the mobile terminal system; the blocking program is used to monitor and block the phone number in the calling request message from any phone call, determining whether the incoming phone number is a phone number defined by the preset rule; if the incoming phone number is a phone number defined by the preset rule, it delays the ring of the phone number defined by the preset rule; therefore, the problem that a software from a third party cannot acquire the authority from the mobile terminal system to control the mobile terminal in order to avoid any harassing calling is solved, and the mobile users are protected from the harassment of malicious calls and unnecessary financial loss.

The forgoing description is only a summary of the present invention. By reference to the following detail embodiment description of the invention, the technique method of the present invention can be understood more clearly and can be implemented according to the present invention, and the mentioned and other objectives, characteristics and advantages of the invention can be more obvious and easily understood.

BRIEF DESCRIPTION OF THE DRAWINGS

By reference to the following description on optimized embodiments, other advantages and beneficial effects of this invention are clear to the person skilled in the art. The drawings are used to indicate the optimized embodiments, shall not be considered as a limit to this invention. In all the drawings, the same component is indicated by one symbol. In the drawings.

DETAIL DESCRIPTION OF THE EMBODIMENTS

Figure 1:
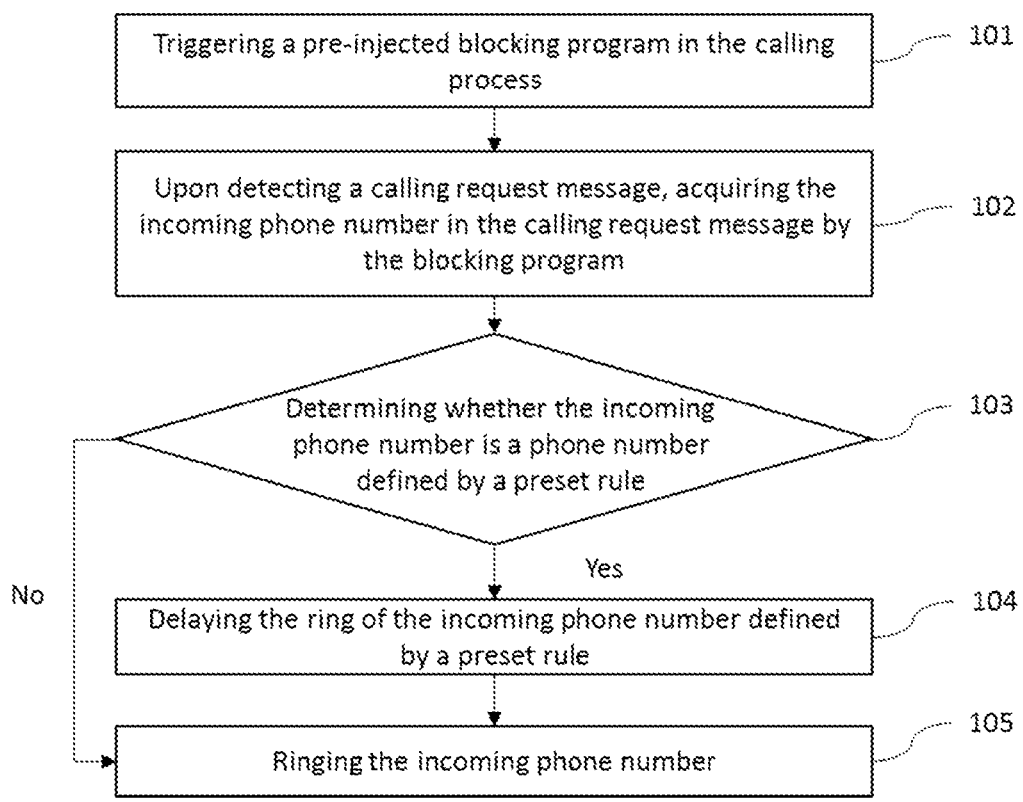
FIG. 1 is a flow chart of embodiment 1 of the method for processing a calling request message of a mobile terminal embodiment of this invention

Preferred embodiments of this disclosure are described in detail by reference to the drawings. Although preferred embodiments are shown in the drawing, it shall be understood that this disclosure shall not be limited by the described embodiment thereof. On contrary, those embodiments are provided to make this disclosure be more thoroughly understood, and to provide complete extent of this disclosure to the person skilled in the art.

The core of this invention is that single ring harassing call often appears in the mobile terminal at present, but due to the protection on the mobile phone system by the operating system of phone manufacturers, it is very difficult for a third party software to acquire the authority of the system to control the mobile terminal to deal with the single ring situation. In the present invention, the root privilege can be acquired upon the detection of either the privilege escalation of the mobile terminal system (root privilege is available in Android phone or jail-break Apple phone) or a preset privilege by the phone manufacturer, to control the phone system to intelligently delay the phone ring and protect users from harassment of malicious calls and unnecessary financial loss.

Referring to FIG. 1, a flow chart of embodiment 1 of the mobile terminal calling request message processing method embodiment of this invention is shown. In this embodiment, a smart terminal with Android system installed is used as an example to describe the principle of this invention, which is only an exemplary description and the scope of this invention shall not be limited by this embodiment and can be suitable for smart terminals with other operating system installed (such as Linux, iOS, Window Phone, Symbian, and BlackBerry OS etc.), comprising the following steps:

Step 101: Triggering a pre-injected blocking program in the calling process;

In an operating system, users are divided into 6 groups. Different operating privilege is assigned to each group, which are administrators, Power User, Users, Backup Operators, Replicator and Guests. Backup Operators and Replicator are set for system maintenance and will not be used for normal cases. Beside those default 6 privilege groups, there are some members with special privilege in the system, which are set for special cases: System, Everyone and Creator Owner etc. Those members are separate accounts and do not belong to any internal groups.

Although the privilege settings constrain users in different scopes, they are not independent from each other, and they all rely on the same command to finish a task, which provides users with the basis of Adjust Token Privilege (ATP). "Adjust Token Privilege" means a user can utilize the vulnerabilities of the system and other methods to break the privilege level assigned by the system, in order to greatly raise its owner privilege level even to an administrator level. The success of ATP relies on a mistaken setting by the administrator (such as the server is not setup according to the "minimum privilege" principle), or newly-appeared overflow vulnerability in the industry (such as utilizing Sass overflow to directly acquire a system privilege). The most common ATPs are mobile phone system reinstallation, mobile phone root, jail break of mobile phone etc.

In a mobile terminal, the operating system of the terminal is strictly protected by the mobile terminal manufacturers. An ordinary program cannot acquire the power user privilege. However by utilizing the vulnerabilities of the system in the mobile terminal, power user privilege can be acquired (acquire the highest privilege of the system upon the detection of the ATP of the system). A privilege management module can be injected into the mobile terminals with vulnerabilities, then other programs can utilize this power privilege. Power privilege can also be acquired after a mobile terminal is manufactured by the collaboration with terminal manufacturers.

In fact, after the acquisition of the power privilege of a mobile terminal, programs can be injected into the mobile terminal. By using the inject techniques, any system process can be controlled.

In general, there are three possible solutions to inject program (process):
1. Putting the code into a Dynamic Link Library (DLL); mapping it to a remote process by using windows hook;
2. Putting the code into a DLL; mapping it to a remote process by using CreateRemoteThread (remote inject) and LoadLibrary (dynamic load);
3. Instead of using DLL, directly copying the code to remote process (using WriteProcessMemory, which is a system process monitor) and usingCreateRemoteThread to execute it.

It shall be noted that the person skilled in the art can take one or multiple of the mentioned inject solutions to realize the program injection, embodiments of this invention shall not be limited herein.

In embodiments of this invention, when injecting the blocking program into the calling process, the blocking program will replace the available calling processing module in the calling process which can be the key functions in the mobile terminal phone system, such as message processing related functions. In an embodiment implementation, the injection of the blocking program can be realized by first searching the memory address of the available calling processing module in the calling process, then replacing the memory address of the available calling processing module with the preset memory address of the blocking.

In reality, the blocking program can be a blocking dynamic library program. Many services can be available in the operation system of the mobile terminal. In the embodiments of this invention, the mentioned services are calling services, by searching the process where the calling services locate in the operation system, loading blocking dynamic library program in the location of this process (using Application Programming Interface (API) dlopen, which is provided by the Linux system that Android system is based on and opens a dynamic link library in an indicated mode, to load this blocking DLL to the process that the services locate), the available message processing related functions of the calling processing module in the calling process can be replaced by the corresponding functions in the blocking dynamic library program.

The described inject techniques are merely exemplary. Those skilled in the art can use other techniques to replace the calling processing module with the blocking program, which is not limited in the embodiments of this invention.

It should be noted that, the functionality that needs to be realized by the corresponding functions of the replaced blocking program equals to that needs to be realized by the corresponding functions of the replaced calling processing module, furthermore, an extra function is added to determine whether an incoming call needs to be blocked.

Step 102: acquiring the incoming phone number in the calling request message upon detecting a calling request message by the blocking program;

As a preferred embodiment of this invention, the incoming phone number in the calling request message may be acquired through a system interface, or from incoming parameters.

It should be noted that, those skilled in the art can use any methods to acquire the incoming phone number in the calling request message, which is not limited in the embodiments of this invention.

Step 103: determining whether the incoming phone number is a phone number defined by a preset rule by the blocking program; if the incoming phone number is a phone number defined by a preset rule, executing step 104, otherwise, executing step 105;

In one preferred embodiment of this invention, the step 103 can comprise the following sub-steps:

Sub-step S11: matching the incoming phone number with the phone numbers defined by the preset rule by the blocking program; if there is a matched item, then calling sub-step S12, otherwise, calling sub-step S13;

In the embodiments of this invention, the phone numbers defined by the preset rule may comprise malicious phone numbers marked by several methods, such as, malicious phone numbers collected and stored as black list phone numbers in the terminal, or, all strange phone numbers that have not been stored in the terminal.

Sub-step S12: the incoming phone number is a phone number defined by the preset rule;

Sub-step S13: the incoming phone number is not a phone number defined by the preset rule.

Step 104: delaying the ring of the phone number defined by the preset rule;

In the embodiments of these inventions, the blocking program in the calling process monitors calling request message in real time. If the incoming phone number in the calling request message is detected as a phone number defined by the preset rule, the blocking program in the calling process will block the phone number defined by a preset rule and delay the ring of the phone number defined by the preset rule to prevent the user from the harassment of malicious calls.

In one preferred embodiment of these inventions, the step 104 can comprise the following sub-steps:

Sub-step S21: acquiring the duration of the calling request of the phone number defined by the preset rule;

Sub-step S22: if the duration of the calling request is larger than a preset threshold value, releasing the ring of the phone number defined by a preset rule;

In general, when a phone is called (although not answered), a ring message will be received from the phone exchange system of the phone operators, which is used by the malicious calls as a criterion to determine whether the phone number being attacked rings. Among them, the single ring call is the most typical malicious harassing call, which is named since the call will be ended as soon as the ring of the phone number being attacked from the phone exchange system has been received.

Now several malicious businesses act business fraud in the phone fee charging, utilizing the principle of single ring call. Those businesses only buy some transmit/receive equipment and act such kind of fee charging business by renting the platform of a third party. Once the users get such kind of calls and call back, enormous fee will be charged. It is said the revenue of one alliance of such business can get net profit of 400 RMB to 2000 RMB per day, which is astonishing. And such kind of alliances are countless, which put the property of users into danger. The embodiments of this invention can protect users from being harassed by single ring calls and unnecessary financial loss.

In the embodiments of this invention, since the functionality that needs to be realized by the corresponding functions of the replaced blocking program equals that needs to be realized by the corresponding functions of the calling processing module, furthermore, an extra function is added to determine whether an incoming call needs to be blocked. The blocking program utilizes the block function to block and determine whether the incoming phone number in the calling request message is a phone number defined by a preset rule. To the phone number defined by a preset rule, the block program will modify the logic operation in the phone to delay some seconds in a preset threshold value (such as 3 seconds, which can be changed in different situations), then call the function that has the same logic as the calling processing module of the incoming call to execute the ring operation. For example, the threshold value is set to be 3 seconds; if the incoming phone number is a strange phone number, such as the phone of a courier, the blocking program may detect that the duration of the calling request from this phone number is larger than 3 seconds, then the ring will be delayed for 3 seconds and after 3 seconds the phone start to ring.

It shall be noted that, in the embodiments of this invention, the preset threshold values is a preset delay time of the ring. The method to preset the threshold value and the value shall not be limited in the embodiments of this invention, for example, the preset threshold value can be set manually or automatically by equipment, which is not constrained in this disclosure.

Sub-step S23: if the duration of the calling request of the phone number defined by a preset rule is smaller or equal to the preset threshold value, then canceling the ring of the phone number defined by the preset rule, and generating a notice message.

In embodiments of this invention, in the situation that a phone number is the mentioned single ring phone numbers, when the phone is called (although not answered), the calling party will receive a ring message from the phone exchange system of the phone operators and use it as a criterion to determine whether the phone number that being attacked rings; therefore, it may be anticipated that the duration of the call from the single ring phone number is very short (normally smaller than the preset threshold value). If the blocking program gets the information that the calling phone number will end within the duration of the preset threshold value, the blocking program will cancel the ring command and the ring command will not be received by the available calling processing module, so that the ring of the terminal is avoided.

In fact, the purpose to generate a notice message is to notify the user that a harassing call is blocked. A notice message can be generated in the preset position of the interface in the mobile terminal Through this notice message, users can check the related information of the blocked phone number, such as the date and location of the incoming phone number, blocking times, harassing call type (such as a single ring call etc.) etc.

As an extension application of this embodiment, if the blocked harassing incoming phone number is a phone number from a strange phone, the blocking program can store this strange phone number into a black list. When a calling request message from this strange phone, which is listed in the black list, is received again, the blocking program will block it directly and count the blocking times of this strange phone number in the black list.

Step 105: ringing the phone number of the incoming call.

In the embodiments of this invention, when the blocking program replaces the available calling processing module, the blocking program not only covers all the logic that can be realized by the calling processing module, but also has extra judgment logic. Therefore, after the incoming phone number is determined as a phone number that does not need to be blocked (such as the phone number of a friend of the user), the calling process executes the processing logic of the available calling processing module in the blocking program and rings the incoming phone normally.

As an extension application of this embodiment, the address of the available calling processing module may be stored. When the incoming phone number is determined to be a phone number that does not need to be blocked by the blocking program, the calling processing module can be recalled (jumping to the address stored) to replace the blocking program. The calling request operation and the following operations can be executed by the calling processing module.

For example, when a friend of the user calls, the blocking program make an judgment that no delay is needed, the calling request from this phone number is processed using the preset logic in the available calling processing module and rings the phone normally.

Figure 2:
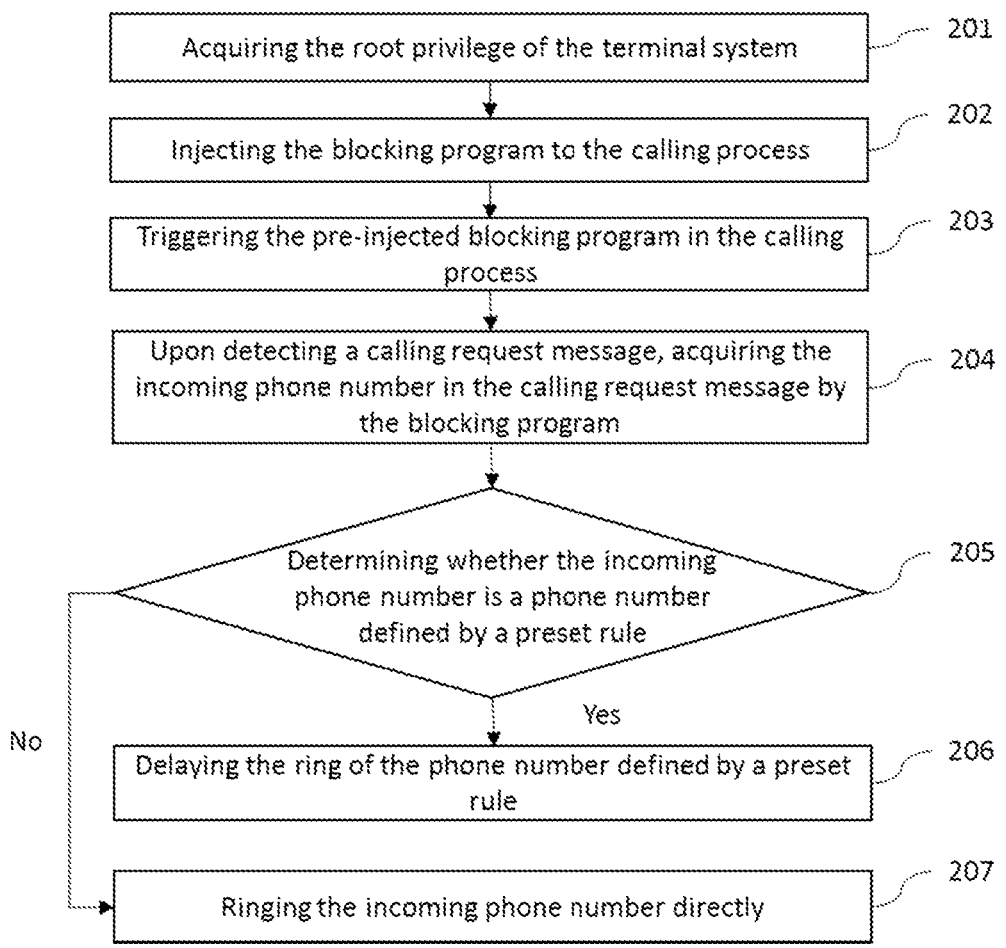
FIG. 2 is a flow chart of embodiment 2 of the method for processing a calling request message of a mobile terminal embodiment of this invention

Referring to FIG. 2, a flow chart of embodiment 2 of the method for processing a calling request message of a mobile terminal embodiment of this invention is shown, specifically, comprising the following steps:

Step 201: acquiring root privilege of the terminal system

Specifically, the root privilege is one of the system privileges and can be considered to be the same concept as a system privilege, but is higher than an administrator privilege. Root is the super administrator account in Linux and UNIX systems. Acquiring a root privilege means acquiring the highest privilege in the mobile terminal, with which adding, and deleting, modifying and checking operations can be applied to any files (including system files) in the mobile phone.

In a mobile terminal, the operation system in the terminal is strictly protected by the mobile terminal manufacturers when the terminal is manufactured. An ordinary program cannot acquire the power user privilege. However by utilizing the vulnerabilities of the system in the mobile terminal, power user privilege can be acquired (acquiring the highest privilege of the system upon the detection of the ATP of the system). A privilege management module can be injected into the mobile terminals with vulnerabilities, then other programs can utilize this power privilege. Power privilege can also be acquired after a mobile terminal is manufactured by the collaboration with terminal manufacturers.

Step 202: injecting a blocking program to the calling process;

In the embodiment of this invention, the inject techniques are used to inject the blocking program, by which any system process can be controlled. When the blocking program is injected into the calling process, the blocking program will replace the available calling processing module in the calling process which can be the key functions in the mobile terminal phone system. For example, the calling message processing function in the phone system can be replaced by the message processing functions in the blocking program, furthermore, and an extra function is added to determine whether an incoming call needs to be blocked.

In one preferred embodiment of this invention, the step 202 may comprise the following sub-steps:

Sub-step S31: searching the memory address of the available calling processing module in the calling process;

Sub-step S32: replacing the memory address of the available calling processing module with the preset memory address of the blocking program.

Specifically, the injection of the blocking program can be realized by firstly searching the memory address of the available calling processing module in the calling process, then replacing the memory address of the available calling processing module with the preset memory address of the blocking program.

Step 203: triggering the blocking program in the calling process;

Specifically, the injected blocking program starts together when the calling process starts.

Step 204: upon detecting a calling request message, acquiring the incoming phone number in the calling request message by the blocking program;

Step 205: determining whether the incoming phone number is a phone number defined by the preset rule; if the incoming phone number is a phone number defined by the preset rule, executing step 206; otherwise, executing step 207;

In one preferred embodiment of this invention, the step 205 may comprise:

Sub-step S41: comparing the incoming phone number with the phone numbers defined by the preset rule by the blocking program; if there is a matched item, then calling the sub-step S42, otherwise, calling the sub-step S43;

In the embodiments of this invention, the phone numbers defined by the preset rule may comprise malicious phone numbers marked by several methods, such as, malicious phone numbers collected and stored as black list phone numbers in the terminal, or, all strange phone numbers that have not been stored in the terminal.

Sub-step S42: the incoming phone number is a phone number defined by the preset rule;

Sub-step S43: the incoming phone number is not a phone number defined by the preset rule;

Step 206: delaying the ring of the phone number defined by the preset rule;

In embodiments of this invention, when a phone is called (although it is not answered), the calling party will receive a ring message from the phone exchange system of the phone operators, which is used by malicious harassing calls as the criterion that can determine whether the phone number being attacked rings. The single ring call is the call started manually or automatically by a machine from malicious parties, which will be ended as soon as the ring of the phone number being attacked from the phone exchange system has been received, harassing the phone number that being attacked or tricking for a call back to charge the fee of phone, to achieve the fraud of charge.

In the embodiments of this inventions, the blocking program in the calling process monitors the calling request message in real time; if the incoming phone number in the calling request message is a phone number defined by a preset rule, the blocking program in the calling process will block the phone number defined by a preset rule and delay the ring of the phone number defined by a preset rule in time to prevent the user from the harassment of malicious calls before the user answers the phone number defined by a preset rule.

In one preferred embodiment of this invention, the step 206 may comprise the following sub-steps:

Sub-step S51: acquiring the duration of the calling request of the phone number defined by the preset rule;

Sub-step S52: if the duration of the calling request is larger than a preset threshold value, releasing the ring of the phone number defined by the preset rule Sub-step S53: if the duration of the calling request of the phone number defined by the preset rule is smaller or equal to the preset threshold value, then canceling the ring of the phone number defined by the preset rule, and generating a notice message.

In embodiments of this invention, in the situation that a phone number is the mentioned single ring phone numbers, when the phone is called (although not answered), the calling party will receive a ring message from the phone exchange system of the phone operators and use it as a criterion to determine whether the phone number being attacked rings; therefore, it may be anticipated that the duration of the call from the single ring phone number is very short (normally is smaller than the preset threshold value). If the blocking program gets the information that the call from this phone number will be ended within the duration of the preset threshold value (e.g. a preset threshold value is 3 seconds), the blocking program will cancel the ring command and the ring command will not be received by the available calling processing module, so that the ring of the terminal is avoided.

Applying the embodiments of this invention can protect the user from single ring harassment to avoid unnecessary financial loss.

Step 207: ringing the phone number of the incoming call;

Specifically, after the incoming phone number is determined as a phone number that does not need to be blocked (such as the phone number of a friend of the user), the calling process executes the processing logic of the available calling processing module in the blocking program and rings the incoming phone normally.

To make the embodiments of this invention be better understood by the person skilled in the art, the embodiments of this invention can be elaborated using the following specific example:

The mobile phone user turn on the single ring blocking function; when the blocking program detect a calling request message, the phone number in the calling message is acquired:

(1) If the phone number is the phone number of the user's friends, the blocking program makes a judgment that no delay is needed; the calling request from this phone number is processed using the preset logic in the available calling processing module and the phone rings normally.

(2) If the incoming phone number is a strange phone number, such as the phone of a courier, the blocking program will delay the ring for 3 seconds (preset delay for ring is 3 seconds) and after 3 seconds the phone starts to ring.

(3) If the incoming phone number is a strange phone number or belongs to malicious phone numbers which are marked by various methods, the blocking program will delay the ring for 3 seconds. If the incoming phone number receives the ring of the mobile phone and ends the call within 3 seconds, since the user defined delay is still not finished, the blocking program cancels the ring delay to protect the user from being harassed.

For the method embodiment in FIG. 2, since it is similar to the method embodiments in FIG. 1, the description is simple, the corresponding description of the method embodiment can be referred to.

It shall be noted that, for simplicity, the method embodiments is described to be a combination of a serial of actions, but those skilled in the art shall appreciate this invention is not constrained by the sequence of the actions, since some steps can occur by other sequence or simultaneously according to this invention. Furthermore, those skilled in the art shall appreciate, the embodiments described in this disclosure are preferred embodiments, the actions and modules related herein is not essential to this invention.

Figure 3:
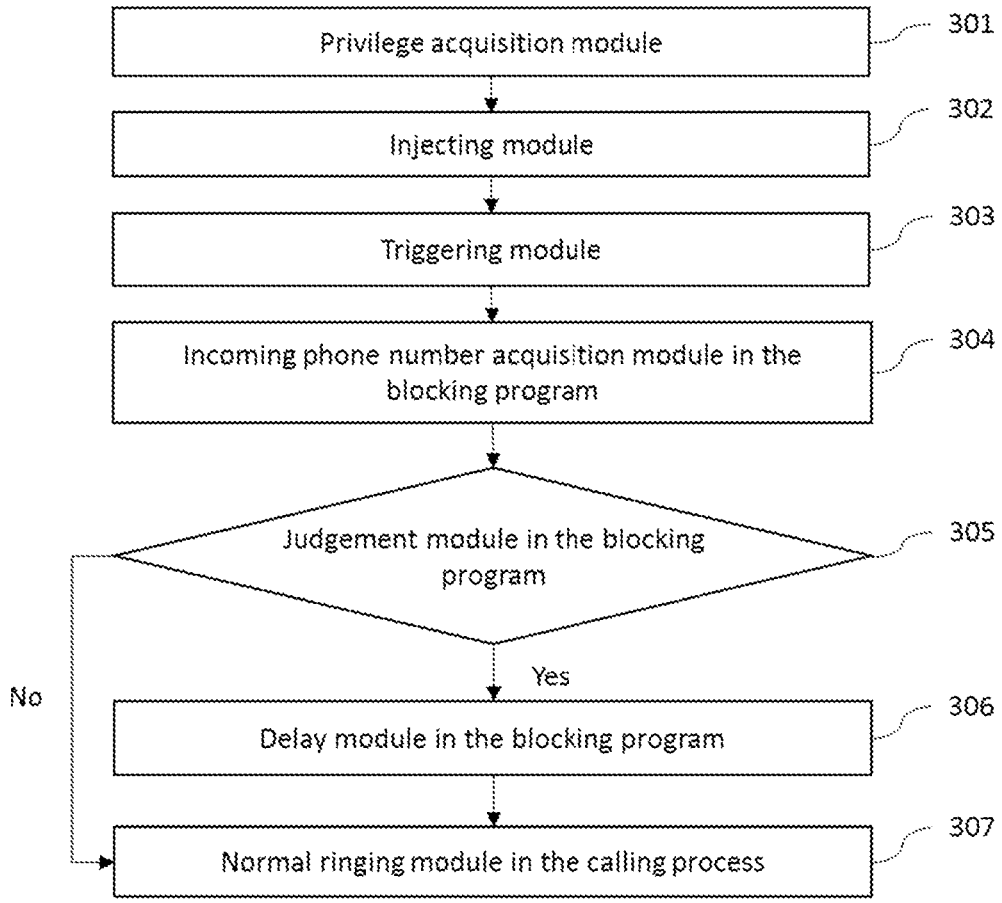
FIG. 3 is a block diagram of processing a calling request message of a mobile terminal of this invention

Referring to FIG. 3, a block diagram of the device for processing a calling request message of a mobile terminal embodiment of this invention is shown, specifically comprising the following modules:

a privilege acquisition module 301, configured to acquire the root privilege of the mobile terminal system.

an injection module 302, configured to an inject blocking program in the calling process;

In a preferred embodiment of this invention, the injection module 302 may comprise the following modules:

a memory address searching module, configured to search the memory address of the available calling processing module in the calling process;

a memory address replacing module, configured to replace the memory address of the available calling processing module with the preset memory address of the blocking program.

a triggering module 303, configured to trigger the pre-injected blocking module in the calling process;

an incoming phone number acquisition module 304 in the blocking program, configured to acquire the incoming phone number in the calling request message upon detecting the calling request message;

a judgment module 305 in the blocking program, configured to determine whether the incoming phone number is a phone number defined by a preset rule; if the incoming phone number is a phone number defined by the preset rule, calling the delay module 306 in the blocking program, otherwise, calling the normal ring module 307 in the calling process;

In one preferred embodiments of this invention, the judgement module 305 in the blocking program may comprises the following modules:

a matching module in the blocking module, configured to compare the incoming phone number with the phone numbers defined by the preset rule; if there is a matched item, then the incoming phone number is a phone number defined by the preset rule, otherwise, the incoming phone number is not a phone number defined by the preset rule.

a delay module 306 in the blocking program, configured to delay the ring of the phone number defined by the preset rule.

In one preferred embodiments of this invention, the delay module 306 in the blocking program may comprise the following modules:

a call request duration acquisition module, configured to acquire the call request duration of the phone numbers defined by a preset rule;

a call request duration judgment module, configured to determine whether the duration of the calling request is larger than a preset threshold value; if the duration of the calling request is larger than the preset threshold value, the delay module in the blocking program is triggered; if the duration of the calling request is smaller than the preset threshold value, the ring cancel module in the blocking program is triggered;

It shall be noted that, in the embodiments of this invention, the method to preset the threshold value and the value shall not be limited, for example, the preset threshold value can be set manually or automatically by an equipment, the threshold value can be 3 seconds or 5 seconds, which can be set by those skilled in the art according to different situations and shall not be constrained in this disclosure.

A ring canceling module in the blocking program, configured to cancel the ring of the phone numbers defined by a preset rule, and generate a notice message;

In fact, the purpose to generate a notice message is to notify the user that a harassing call is blocked. A notice message can be generated in the preset position of the interface in the mobile terminal Through this notice message, users can check the related information of the blocked phone number, such as the date and location of the incoming phone number, blocking times, harassing call type (such as single ring call etc.) etc.

a normal ring module 307 in the calling process, configured to ring the incoming phone number.

Specifically, after the incoming phone number is determined as a phone number that do not need to be blocked (such as the phone number of a friend of the user), the normal ring module 307 in the calling process executes the original logic of the functions that being replaced, the calling process rings this phone number normally and this phone number will ring directly.

For the device embodiment in FIG. 3, since it is similar to the above method embodiments, the description is simple, the corresponding description of the method embodiment can be referred to.

Figure 4:
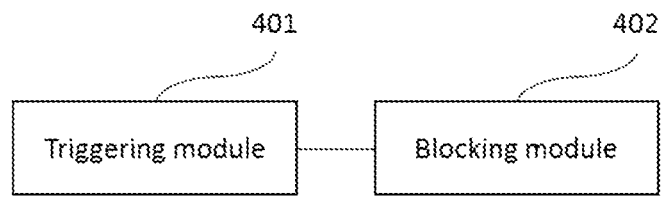
FIG. 4 is a block diagram of the system installed in mobile terminal for processing a calling request message embodiment of this invention

Referring to FIG. 4, a block diagram of the system installed in a mobile terminal for processing a calling request message embodiment of this invention is shown, specifically, comprising a triggering module and a blocking module, wherein:

the triggering module 401, configured to trigger the pre-injected blocking module in the calling process;

the blocking module 402, configured to acquire the incoming phone number in the calling request message upon detecting the calling request message and determine whether the incoming phone number is a phone number defined by a preset rule; if the incoming phone number is a phone number defined by the preset rule, delaying the ring of the phone number defined by a preset rule; otherwise, ringing according to the incoming phone number.

Specifically, upon the detection of a calling request message, the related function in the blocking program is called, the incoming phone number in the calling request message can be acquired by the blocking module 402 through the interface of the system or the incoming parameters.

The blocking module 402 determines whether the incoming phone number is a phone number defined by the preset rule through the phone numbers defined by the preset rule.

For the phone number defined by the preset rule, the blocking module 402 will delay the ring of the phone number defined by a preset rule; specifically, the blocking module 402 acquires the duration of the calling request of the phone number defined by the preset rule, if the duration of the calling request is larger than a preset threshold value (e.g. the preset threshold values is 3 seconds), the blocking module 402 rings the phone number defined by the preset rule after 3 seconds; if the duration of the calling request of the phone number defined by a preset rule is smaller than or equals to the preset threshold value, the blocking module 402 cancels the ring of the phone number defined by the preset rule, and generates a notice message to remind the user that a harassing call has been blocked.

For the phone number that is not defined by the preset rule (such as the phone number of a friend of the user), the blocking module 402 executes the original logic of the functions being replaced, the calling process will call this phone number normally and this phone number rings normally.

For the system embodiment in FIG. 4, since it is similar to the above method embodiments, the description is simple, the corresponding description of the method embodiment can be referred to.

Each component embodiment in this invention may be realized as hardware, or as software module run in one or multiple CPU, or a combination of them. Those skilled in the art shall appreciate that, in practice, some or all functionalities of some or all components of the mobile terminal calling request message processing equipment according to the embodiments of this invention can be realized by using a microprocessor or Digital Signal Processor (DSP). This invention may be realized as device or equipment programs that execute part of or all methods described herein (for example, computer program and computer program product). Such program to realize this invention may be stored in a computer readable medium, or in a form of one or multiple signals. Such signals may be downloaded from websites in the internet, or be provided in a carrier signal, or be provided as any other forms.

Figure 5:
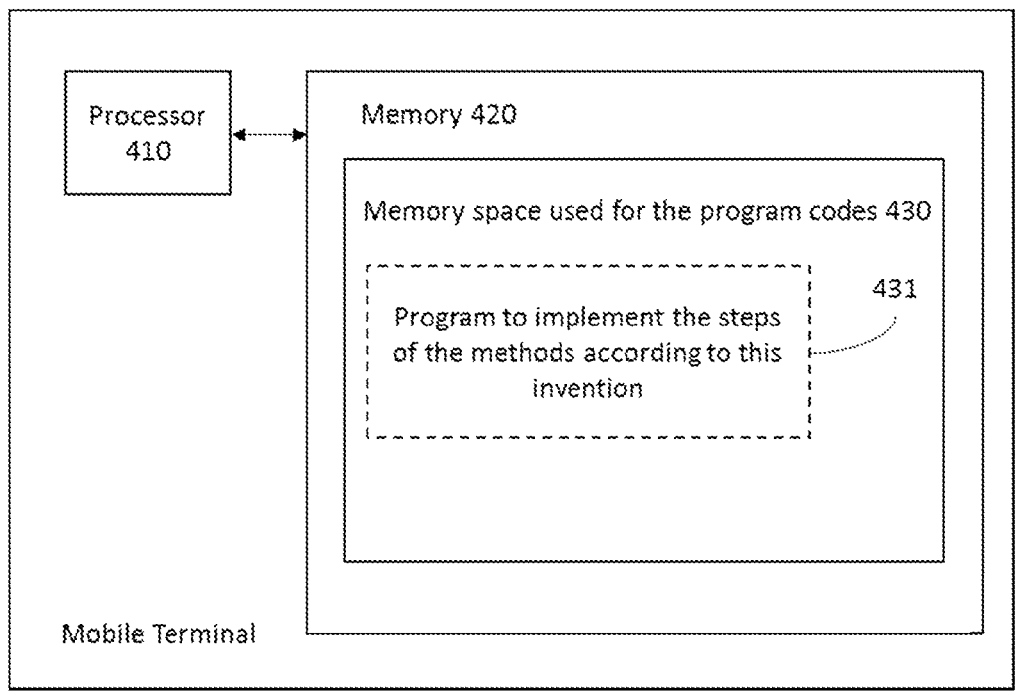
FIG. 5 is a block diagram of the mobile terminal to implement the method according to this invention
Figure 6:
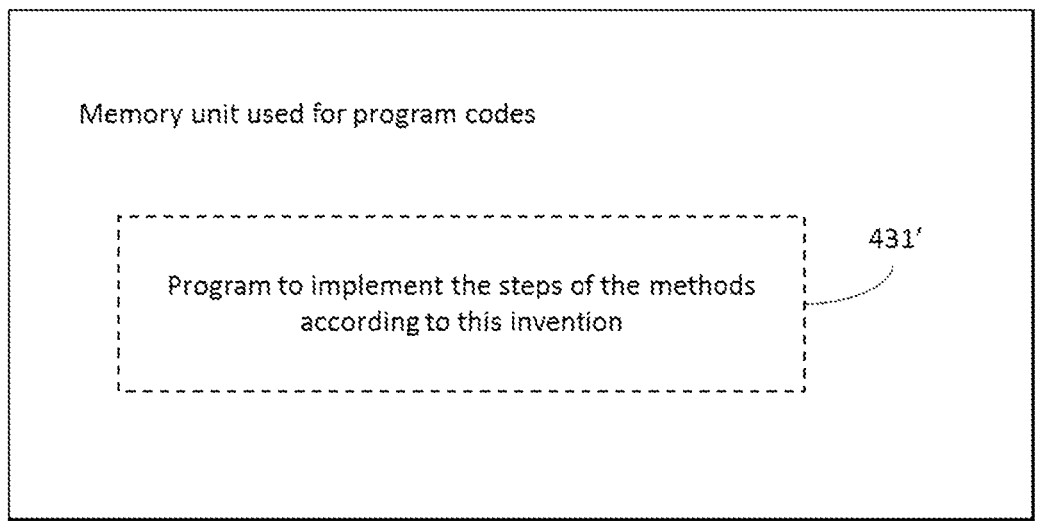
FIG. 6 is a storage unit to store or carry the program code to realize the method according to this invention.

For example, a block diagram of the mobile terminal to implement the method according to this invention is schematically shown in FIG. 5; traditionally, this mobile terminal comprises processor 410 and computer program product or computer readable medium in memory 420 form. Memory 420 may be electric memory, such as flash, Electrically Erasable Programmable Read-Only Memory (EEPROM), EPROM, hard disk or ROM. Memory 420 comprises memory space 430 used for the program code 431 to execute any methods or steps in the described methods. Those program code can be read or written to the one or multiple computer program products from one or multiple computer program products. Those computer program products may comprise program code carriers, such as hard disk, Compact Disc (CD), memory card or floppy disk etc. The computer program product is normally portable or fixed memory unit, like the one described by referring to FIG. 6. This memory unit may comprise memory region, memory space that configured as memory 420 in the mobile terminal in FIG. 5. Program codes may be compressed in any suitable forms. Normally, memory unit comprises computer readable code 431', which are codes that can be read by a processor such as 410. When those codes run by a mobile terminal, every steps in the methods described above are executed in this mobile terminal In this disclosure, reference to "one embodiment", "embodiment", "one or multiple embodiments", means that a particular feature described in connection with the embodiment, structure, or characteristic is included in at least one embodiment described in this invention. Furthermore, it shall be noted that, words like "in one embodiments" may not indicate to the same embodiment.

In the description provided herein, numerous specific details are described. However, it can be understood that the embodiments of this invention may be practiced without these specific details. In some instances, it has not been shown in detail well-known methods, structures and techniques, so as not to obscure the understanding of this description.

It should be noted that the above-described embodiments of the present invention will be described the present invention rather than limiting, and that those skilled in the art without departing from the scope of the appended claims may be devised alternative embodiments. In the claims, any reference signs located between parentheses should not be configured to restrict the claims. The word "comprising" does not exclude the presence of elements or steps that not listed in the claims. Located element before the word "one" or "one" does not exclude the existence of a plurality of such elements. The present invention may be by means of hardware comprising several distinct elements, and by means of a suitably programmed computer to achieve. In enumerating several means of unit claim, several of these means may be embodied by the same item of hardware. Word first, second, and third, etc. does not denote any order. These words can be interpreted as a name.

In addition, it should be noted that the language used in this specification primarily is selected for the purposes of readability and teachings, rather than is selected to explain or limit the subject matter of this invention. Accordingly, in the appended claims without departing from the scope and spirit of the claims, many modifications and variations are obvious to those of ordinary skill in the art. For the scope of the invention, the disclosure of the present invention is illustrative and not restrictive, the scope of the invention is defined by the appended claims.

What is claimed:

1. A method for processing a calling request message of a mobile terminal, comprising:
    injecting a blocking program in a calling process, wherein the injecting the blocking program in the calling process comprises:
        searching a memory address of an available calling processing module in the calling process, and
        replacing the memory address of the available calling processing module with a preset memory address of the blocking program;
    triggering the injected blocking program in the calling process;
    upon detecting a calling request message, acquiring an incoming phone number in the calling request message by the injected blocking program;
    determining whether the incoming phone number is a phone number defined by a preset rule by the injected blocking program;
    if the incoming phone number is defined by the preset rule, then delaying a ring of the phone number defined by the preset rule.

2. The method according to claim 1, wherein before injecting the blocking program in the calling process, further comprising:
    acquiring a root privilege of the mobile terminal system.

3. The method according to claim 1, the determining whether the incoming phone number is a phone number defined by the preset rule by the blocking program comprising:
    comparing the incoming phone number with the phone numbers defined by the preset rule by the blocking program;
    if there is a matched item, then the incoming phone number is a phone number defined by the preset rule;
    if there is no matched item, then the incoming phone number is not a phone number defined by the preset rule.

4. The method according to claim 3 wherein the delaying the ring of the phone number defined by the preset rule if the incoming phone number is a phone number defined by the preset rule comprising:
    acquiring the duration of the calling request of the phone number if the incoming phone number is a phone number defined by the preset rule;
    ringing the phone number defined by the preset rule if the duration of the calling request is larger than a preset threshold value;
    canceling the ring of the phone number defined by the preset rule, and generating a notice message if the duration of the calling request is smaller or equal to the preset threshold value.

5. The method according to claim 3, further comprising:
    ringing the incoming phone number, if the incoming phone number is not a phone number defined by the preset rule.

6. A mobile terminal for processing a calling request message, comprising:
    a processor; and
    a memory communicatively coupled to the processor, the memory configured to comprise:
    an injecting module, when executed by the processor, configured to inject a blocking program in the calling process, wherein the injecting module further comprises:
        a memory address searching module, when executed by the processor, configured to search a memory address of an available calling processing module in the calling process;
        a memory address replacing module, when executed by the processor, configured to replace the memory address of the available calling processing module with a preset memory address of the blocking program
    a trigger, when executed by the processor, configured to trigger the injected blocking program in the calling process;

the injected blocking program, when executed by the processor, configured to acquire an incoming phone number in a calling request message upon detecting the calling request message and determine whether the incoming phone number is a phone number defined by the preset rule;

when the incoming phone number is defined by the preset rule, the injected blocking program configured to delay a ring of the phone number defined by the preset rule.

7. The mobile terminal according to claim 6, further comprising:

a privilege acquisition module, when executed by the processor, configured to acquire a root privilege of the mobile terminal system before injecting the blocking program in the calling process.

8. The mobile terminal according to claim 6, wherein the blocking program, when executed by the processor, further configured to:

compare the incoming phone number with the phone numbers defined by the preset rule; if there is a matched item, then the incoming phone number is a phone number defined by the preset rule; if there is no matched item, the incoming phone number is not a phone number defined by the preset rule.

9. The mobile terminal according to claim 8, wherein the blocking program, when executed by the processor, further configured to:

acquire the call request duration of the phone numbers defined by the preset rule when the incoming phone number is a phone number defined by the preset rule;

determine whether the duration of the calling request is larger than a preset threshold value;

ring the phone number defined by the preset rule when the duration of the calling request is larger than the preset threshold value;

cancel the ring of the phone numbers defined by the preset rule and generate a notice message when the duration is smaller than or equal to the preset threshold value.

10. The mobile terminal according to claim 8, further comprising:

a normal ring module, when executed by the processor, configured to ring the incoming phone number when the incoming phone number is not a phone numbers defined by the preset rule.

11. A non-transitory computer readable medium, having instructions stored thereon that, when executed by at least one processor, cause the at least one processor to perform operations for processing a calling request message of a mobile terminal, comprising:

injecting a blocking program in a calling process, wherein the injecting the blocking program in the calling process comprises:

searching a memory address of an available calling processing module in the calling process, and replacing the memory address of the available calling processing module with a preset memory address of the blocking program;

triggering the injected blocking program in the calling process;

upon detecting a calling request message, acquiring an incoming phone number in the calling request message by the injected blocking program;

determining whether the incoming phone number is a phone number defined by a preset rule by the injected blocking program;

delaying the ring of the phone number defined by the preset rule when the incoming phone number is defined by the preset rule.

12. The non-transitory computer readable medium of claim 11, wherein before the injecting the blocking program in the calling process, further comprising:

acquiring a root privilege of the mobile terminal system.

13. The non-transitory computer readable medium of claim 11, the determining whether the incoming phone number is a phone number defined by the preset rule by the blocking program further comprising:

comparing the incoming phone number with the phone numbers defined by the preset rule by the blocking program;

if there is a matched item, the incoming phone number is a phone number defined by the preset rule;

if there is no matched item, the incoming phone number is not a phone number defined by the preset rule.

14. The non-transitory computer readable medium of claim 13, wherein the delaying the ring of the phone number defined by the preset rule if the incoming phone number is a phone number defined by the preset rule further comprising:

acquiring the duration of the calling request of the phone number if the incoming phone number is a phone number defined by the preset rule;

ringing the phone number defined by the preset rule if the duration of the calling request is larger than a preset threshold value;

canceling the ring of the phone number defined by the preset rule, and generating a notice message if the duration of the calling request is smaller than or equal to the preset threshold value.

15. The non-transitory computer readable medium of claim 11, further comprising:

ringing the incoming phone number when the incoming phone number is not a phone number defined by the preset rule.

\* \* \* \* \*